United States Patent
Gay-Bellile et al.

(10) Patent No.: US 6,839,357 B1
(45) Date of Patent: Jan. 4, 2005

(54) TRANSMISSION SYSTEM, RECEIVER, AND INTERCONNECTION NETWORK

(75) Inventors: Olivier Gay-Bellile, Paris (FR); Eric Dujardin, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/568,285

(22) Filed: May 10, 2000

(30) Foreign Application Priority Data

May 11, 1999 (FR) .............................................. 99 06020

(51) Int. Cl.[7] .............................. H04L 12/28; H04J 3/04; H04J 3/02
(52) U.S. Cl. ........................ 370/412; 370/535; 370/337
(58) Field of Search ................................. 370/535, 537, 370/412, 357, 395.1–395.31, 390, 432

(56) References Cited

U.S. PATENT DOCUMENTS 5,937,202 A * 8/1999 Crosetto ...................... 712/19
6,456,628 B1 * 9/2002 Greim et al. ............... 370/466

OTHER PUBLICATIONS

"A Survey of Interconnection Networks", by Tse–yun Feng, IEEE 1981 pp. 12–27.

* cited by examiner

Primary Examiner—Frank Duong
Assistant Examiner—Ronald Abelson
(74) Attorney, Agent, or Firm—Laurie E. Gathman

(57) ABSTRACT

The invention provides a programmable network architecture for interconnecting several calculation modules in a receiver of a data transmission system with a very high data rate, which receiver comprises a forward and a return communication path. The architecture renders it possible to realize local communications between neighboring calculation modules and global communications between non-neighboring calculation modules. The network is formed by a sequence of programmable interconnection cells comprising memory means for storing the data which traverse between two non-neighboring modules which are present in the forward path and the return path, respectively. The role of these memories is to guarantee that the data pass through at most two successive multiplexers in one clock cycle, so that a high clock speed can be chosen.

19 Claims, 2 Drawing Sheets

TRANSMISSION SYSTEM, RECEIVER, AND INTERCONNECTION NETWORK

DESCRIPTION

1. Field of the Invention

The invention relates to a transmission system comprising at least a transmitter and a receiver, said receiver comprising calculation modules designed for communicating with each other via an interconnection network comprising a forward path and a return path, said network serving to realize:

unidirectional local communications between mutually neighboring calculation modules along the forward path and the return path, and unidirectional global communications between non-neighboring calculation modules.

It also relates to a receiver and an interconnection network for interconnecting calculation modules in a data communication system which comprises a forward path and return path, said network serving to realize:

unidirectional local communications between mutually neighboring calculation modules along the forward path and the return path, and unidirectional global communications between non-neighboring calculation modules.

It has numerous applications, in particular in broadband digital communication systems for increasing the communication speed and shortening the processing times between the various elements of the receiver, and for providing a programmable network architecture in dependence on the envisaged type of application.

2. Background

The article by T.-Y. Feng in the journal IEEE Computer, pp. 12–27, December 1981, entitled "A Survey of Interconnection Networks" in particular discloses an interconnection network architecture which has an annular topology, or having two dimensions, formed by a forward path and a return path. The article does not describe how the various components of the architecture are mutually interconnected, neither does it state how the communications are realized.

SUMMARY OF THE INVENTION

The present invention describes a transmission system, a receiver, and a programmable network architecture for interconnecting several components of the receiver arranged in a forward path and a return path so as to realize communications at a very high data rate capable of comprising feedback loops.

To achieve this, a system, a receiver, and a network as mentioned in the opening paragraphs are characterized in that said local and global communications are realized by means of a programmable sequence of interconnection cells which comprise memory means for storing the data traversing between two non-neighboring modules situated at least in the forward path or on the return path.

According to a major characteristic of the invention, each interconnection cell is connected to at least one calculation module, referred to as current module, and comprises multiplexing means which are connected to neighboring cells for multiplexing the data originating from different modules in the forward path and the return path, said memory means being connected to the respective multiplexing means upstream and downstream of said current module so that said data pass through at most two neighboring cells in one calculation cycle.

BRIEF DESCRIPTION OF THE DRAWINGS

The following description in combination with the annexed drawings, all by way of non-limitative example, will clarify how the invention may be put into practice.

DESCRIPTION OF THE EMBODIMENTS

Figure 1:
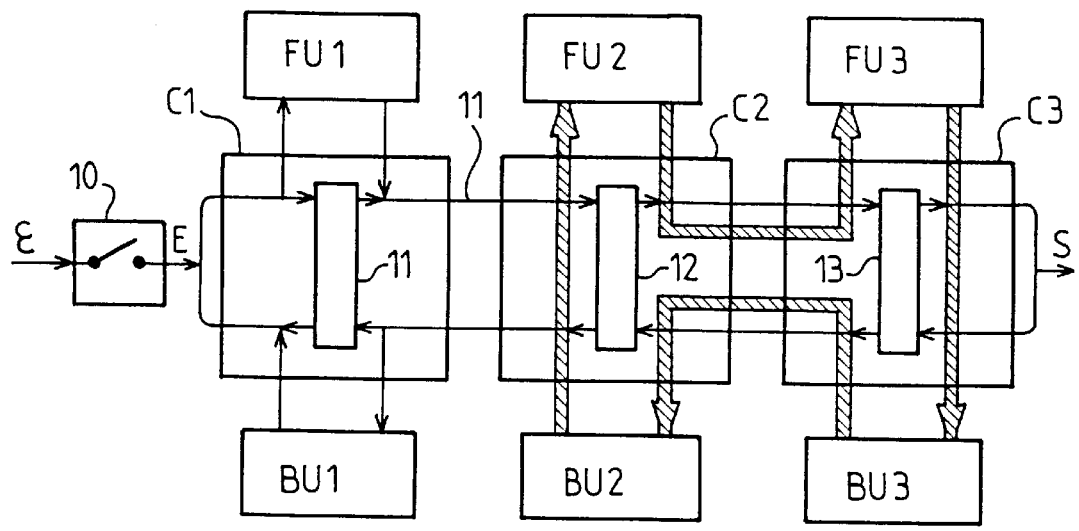
FIG. 1 is a block diagram showing an example of a receiver according to the invention.

FIG. 1 shows a simplified block diagram of an example of a receiver according to the invention. It refers in particular to a digital TV receiver, especially for demodulating a signal which was received in the form of data samples E and for providing symbols S at the output. The receiver comprises:

a receiver block 10 for receiving an analog input signal $\epsilon$ and converting it into digital input samples E, calculation modules FU1, FU2, and FU3 which form a forward communication path, calculation modules BU1, BU2, and BU3 forming a return path, an interconnection network 11 comprising:

programmable interconnection cells referenced C1, C2, and C3 for ensuring fast communications, shown in thick drawn lines and by way of example, between various calculation modules in the forward path and the return path, and memory means 11, 12, and 13 for storing the data passing between two non-neighboring modules which lie in the forward path and the return path, respectively.

The calculation modules may be various filtering units connected in a cascade arrangement for realizing, for example: an anti-aliasing filter, a Nyquist filter, and an equalizer. Several successive digital filtering operations are in fact necessary in a digital TV for achieving the demodulation function. Moreover, these demodulations render necessary feedback loops for synchronizing the receiver with the transmitter. The invention provides a modular interconnection network architecture which particularly suits these applications, which involve considerable restraints as regards the calculation power and time. It comprises programmable interconnection cells C1, C2, and C3 provided with respective memory means 11, 12, and 13 for storing the data transmitted between two non-neighboring calculation modules so that they will pass through at most two neighboring cells in one calculation cycle.

Figure 2:
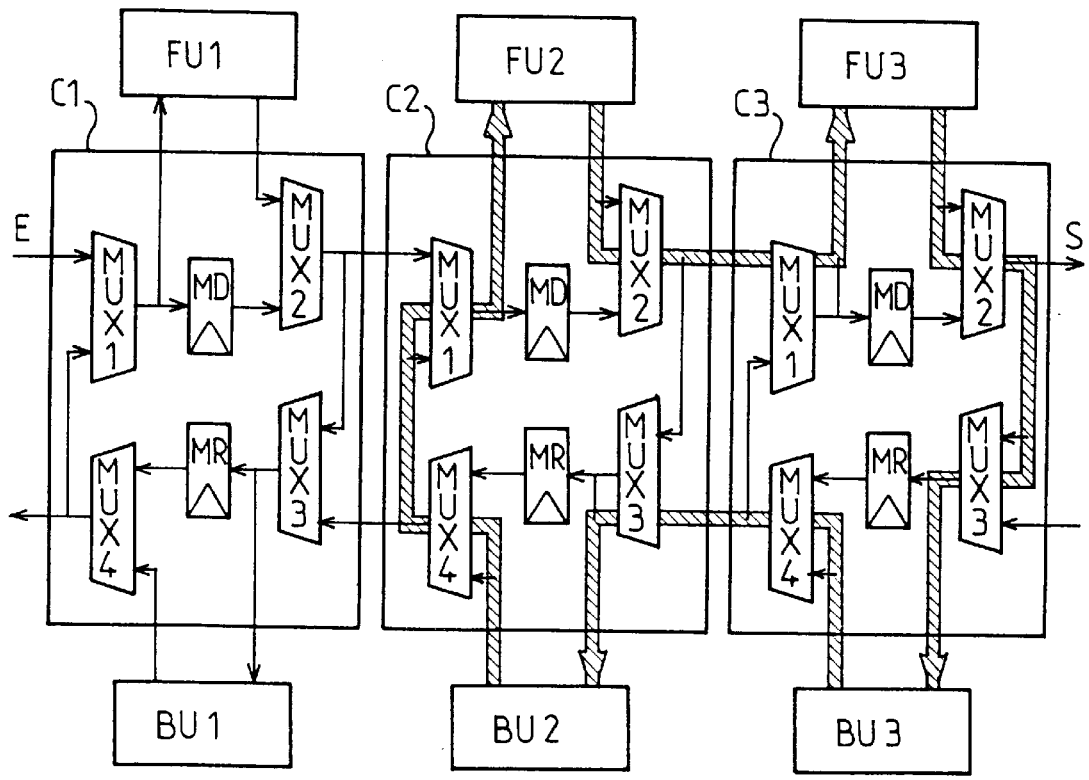
FIG. 2 shows an example of an interconnection network according to the invention.

FIG. 2 shows an embodiment for the receiver of FIG. 1 and the interconnection network 11 according to the invention in more detail.

It is an object of the invention to define an interconnection network which has a simple topology and is capable of operating at a high frequency. The connections in general utilize multiplexers or data buses for multiplexing the data originating from the various calculation modules over the various communication paths. Now a bus renders possible the communication of only a single data in one clock cycle. The topology of the interconnection network according to the invention is defined such that all the calculation blocks can provide and receive a data in each cycle. The communication time between two neighboring modules being one clock cycle, the transfer time for the data depends on the distance traveled by these data and thus on the number of multiplexers traversed in one clock cycle. To increase the clock speed of the network, the invention provides means for safeguarding that the data do not pass through more than two multiplexers in one clock cycle.

The interconnection network is formed by several successive interconnection cells capable of realizing all the communications required by the system. They are in particular programmable for realizing:

unidirectional local communications between neighboring calculation modules along the forward path or the return path, unidirectional global communications between the non-neighboring calculation modules.

Since the return path can be used in the feedback loops, local communications may accordingly be realized between two neighboring modules along the feedback loop, i.e. between two mutually facing modules, one situated in the forward path and the other in the return path.

FIG. 2 illustrates an example of an application which carries out data communications, shown in thick hatched lines, between the modules FU2 and FU3 in the forward direction and which realizes a feedback loop involving the modules BU2 and BU3 in the return path. This may relate to, for example, data communications between different elements of a digital TV receiver for the purpose of channel decoding.

In the embodiment shown, each cell Ci (i=1, 2, or 3) is directly connected via multiplexers MUX to a calculation module $FU_i$ in the forward path, referred to as current forward module, and to a module $BU_i$ in the return path, referred to as the current return module. The cell comprises a total of four multiplexers MUX controlled by a control member (not shown) provided with a clock for multiplexing the data originating from the different modules $FU_i$ and $BU_i$ of the various communication lines. A first memory MD, referred to as forward memory, is connected to the two multiplexers $MUX_1$ and $MUX_2$ which are situated on the forward path, upstream and downstream of the current forward module $FU_i$, respectively, and a second memory MR, referred to as return memory, is connected to the two multiplexers $MUX_3$ and $MUX_4$ on the return path, which are situated upstream and downstream of the current return module $PU_1$, respectively.

The first multiplexer $MUX_1$ has a first input for receiving the data coming from the forward path, a second input for receiving the data coming from the feedback loop, and an output connected to the forward memory MD and to the current module $FU_i$ of the forward path. The second multiplexer $MUX_2$ has a first input for receiving the data stored in the forward memory MD, a second input for receiving the data provided by the current module of the forward path $FU_i$, and an output for transmitting the multiplexed input data over the forward path and over the return path through the feedback loop. The third multiplexer $MUX_3$ has a first input for receiving the data coming from the output of the second multiplexer $MUX_2$, a second input for receiving data coming from the return path of the neighboring cell, and an output connected to the return memory MR and to the current calculation module of the return path $BU_i$. The fourth multiplexer $MUX_4$ has a first input for receiving the data stored in the return memory MR, a second input for receiving the data provided by the current module of the return path $BU_i$, and an output for transmitting the multiplexed input data over the return path and over the forward path via the feedback loop.

The role of the memories MD and MR, shown as registers in the Figure, is to guarantee that the data will not traverse through more than two successive multiplexers in one clock cycle. This renders it possible to choose a high clock speed and thus to speed up the local communications. Since most communications are local in this type of application, i.e. they take place at close range between neighboring calculation modules, it is more advantageous to advance this type of communication by adapting the clock speed of the network to fast communications rather than to long-distance or global communications, which are much less frequent.

Figure 3A:
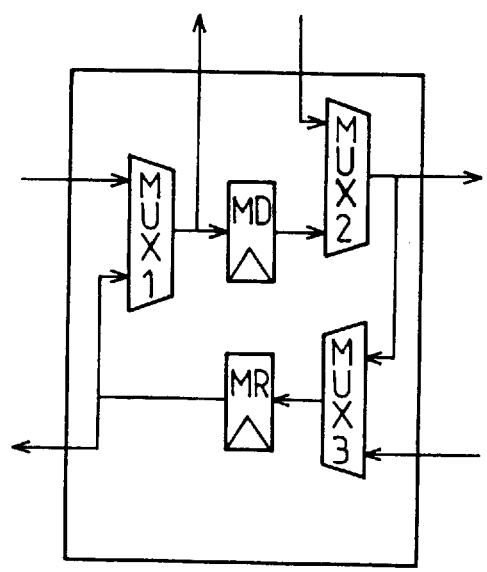
FIG. 3 shows examples of interconnection cells in two embodiments of the invention.

FIG. 3 shows two modified embodiments of interconnection cells according to the invention, comprising three programmable multiplexers $MUX_1$, $MUX_2$ and $MUX_3$. FIG. 3A illustrates an example of a simplified cell which can be used for applications where a calculation module is absent in the return path. The simplified cell is directly connected to only a single module in the forward path. The output of the third multiplexer $MUX_3$ is connected only to the register MR. The output of the register MR is connected to an input of the first multiplexer $MUX_1$ and to the return path of the next cell.

Figure 3B:
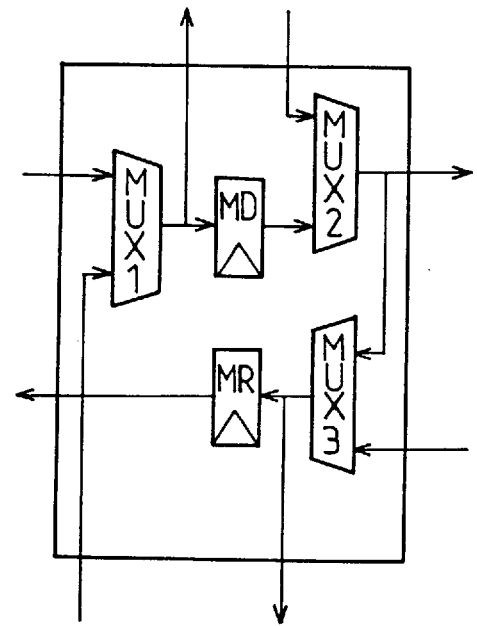

FIG. 3B illustrates an example of a simplified cell which can be used for applications which comprise a direct reaction between two modules FU and BU which face each other in the forward path and the return path. The input of the first multiplexer $MUX_1$ is directly connected to an output of a calculation module of the return path BU, and the output of the register MR is only connected to the next cell via the return path.

Figure 4:
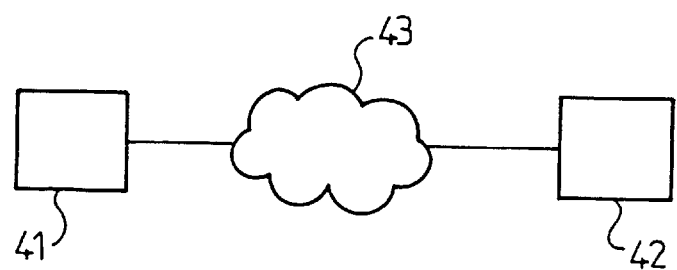
FIG. 4 is a general diagram of a transmission system according to the invention.

FIG. 4 is a general diagram of a transmission system according to the invention comprising a transmitter 41, a receiver 42 of the type as shown in FIG. 1, and a transmission channel 43 for supporting, for example, satellite, cable, or radio wave transmissions, etc.

What is claimed is:

1. A transmission system comprising at least a transmitter and a receiver, the receiver comprising calculation modules designed for communicating with each other via an interconnection network comprising a forward path and a return path, the network serving to realize unidirectional local communications between mutually neighboring calculation modules in the forward path and the return path and unidirectional global communications between non-neighboring calculation modules;

wherein the local and global communications are realized by means of a programmable sequence of interconnection cells, each interconnection cell connected to at least one calculation module, referred to as current module, and the interconnection cells comprise:

multiplexing means which are connected to neighboring cells for multiplexing data originating from different modules in the forward path and the return path; and memory means for storing data traversing between two non-neighboring modules situated at least in the forward path or in the return path, the memory means connected to the respective multiplexing means upstream and downstream of the current module such that the data pass through at most two neighboring cells in one calculation cycle.

2. A system as claimed in claim 1, wherein the multiplexing means are connected to the forward and return paths such that data pass between the forward and return paths.

3. A system as claimed in claim 1, wherein at least one interconnection cell is connected to two calculation modules, one of the two calculation modules coupled to the forward path and the other of the two calculation modules coupled to the return path, and the two calculation modules communicate with each other through the multiplexing means.

4. A system as claimed in claim 3, wherein the multiplexing means are connected such that data communicated between the two calculation modules pass through at most two multiplexers in one calculation cycle.

5. A system as claimed in claim 1, wherein the receiver is a receiver for entertainment media.

6. A system as claimed in claim 5, wherein the receiver is a TV receiver.

7. A system as claimed in claim 1, wherein the calculation modules are filtering units.

8. A receiver comprising calculation modules designed for communicating with each other via an interconnection network comprising a forward path and a return path, the network serving to realize unidirectional local communications between mutually neighboring calculation modules in the forward path and the return path and unidirectional global communications between non-neighboring calculation modules;

wherein the local and global communications are realized by means of a programmable sequence of interconnection cells, each interconnection cell connected to at least one calculation module, referred to as current module, and the interconnection cells comprise:

multiplexing means which are connected to neighboring cells for multiplexing data originating from different modules in the forward path and the return path; and memory means for storing data traversing between two non-neighboring modules situated at least in the forward path or in the return path, the memory means connected to the respective multiplexing means upstream and downstream of the current module such that the data pass through at most two neighboring cells in one calculation cycle.

9. A receiver as claimed in claim 8, wherein the multiplexing means are connected to the forward and return paths such that data pass between the forward and return paths.

10. A receiver as claimed in claim 8, wherein at least one interconnection cell is connected to two calculation modules, one of the two calculation modules coupled to the forward path and the other of the two calculation modules coupled to the return path, and the two calculation modules communicate with each other through the multiplexing means.

11. A receiver as claimed in claim 10, wherein the multiplexing means are connected such that data communicated between the two calculation modules pass through at most two multiplexers in one calculation cycle.

12. A receiver as claimed in claim 8, wherein the receiver is a receiver for entertainment media.

13. A receiver as claimed in claim 12, wherein the receiver is a TV receiver.

14. A receiver as claimed in claim 8, herein the calculation modules are filtering units.

15. An interconnection network for interconnecting calculation modules in a data communication system which comprises a forward path and a return path, the network serving to realize unidirectional local communications between mutually neighboring calculation modules in the forward path and the return path and unidirectional global communications between non-neighboring calculation modules;

wherein the local and global communications are realized by means of a programmable sequence of interconnection cells, each interconnection cell connected to at least one calculation module, referred to as current module, and the interconnection cells comprise:

multiplexing means which are connected to neighboring cells for multiplexing data originating from different modules in the forward path and the return path; and memory means for storing data traversing between two non-neighboring modules situated at least in the forward path or in the return path, the memory means connected to the respective multiplexing means upstream and downstream of the current module such that the data pass through at most two neighboring cells in one calculation cycle.

16. A network as claimed in claim 15, wherein the multiplexing means are connected to the forward and return paths such that data pass between said forward and return paths.

17. A network as claimed in claim 15, wherein at least one interconnection cell is connected to two calculation modules, one of the two calculation modules coupled to the forward path and the other of the two calculation modules coupled to the return path, the two calculation modules communicating with each other through the multiplexing means.

18. A network as claimed in claim 17, wherein the multiplexing means are connected such that data communicated between the two calculation modules pass through at most two multiplexers in one calculation cycle.

19. A network as claimed in claim 15, wherein the calculation modules are filtering units.

* * * * *